May 20, 1952  H. H. PLATTS  2,597,815
HYDRAULIC BOOSTER AND LEVER MEANS FOR CONVEYING
SPEED CONTROL SIGNALS TO A CONTROL LEVER FOR
SPEED GOVERNORS, THROTTLES OR THE LIKE
Filed Aug. 21, 1947  2 SHEETS—SHEET 1

HOWARD H. PLATTS
*INVENTOR.*

BY *Rob Munger*
*Attorney*

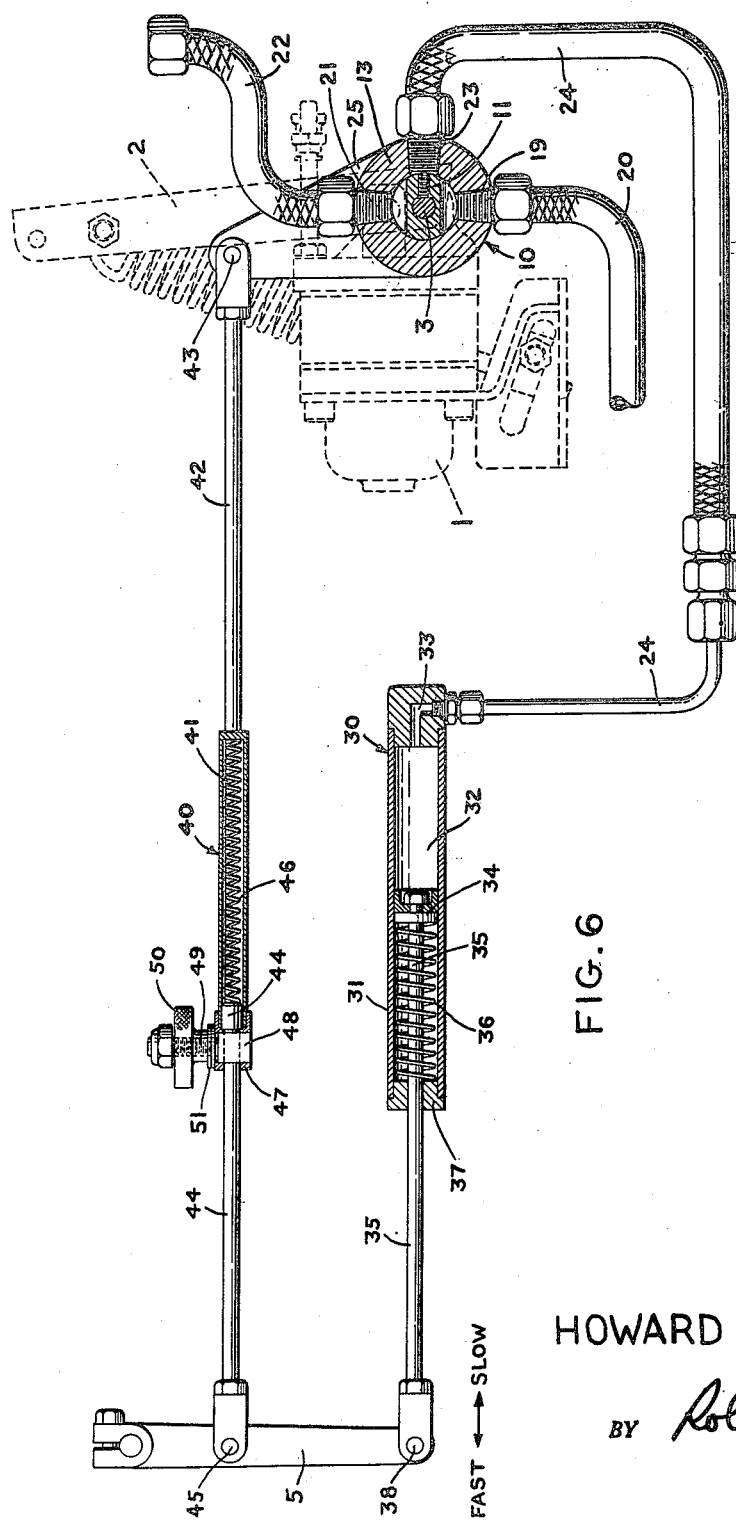

Patented May 20, 1952

2,597,815

UNITED STATES PATENT OFFICE 2,597,815

HYDRAULIC BOOSTER AND LEVER MEANS FOR CONVEYING SPEED CONTROL SIGNALS TO A CONTROL LEVER FOR SPEED GOVERNORS, THROTTLES, OR THE LIKE

Howard H. Platts, Holyoke, Mass., assignor to Worthington Pump and Machinery Corporation, Harrison, N. J., a corporation of Delaware Application August 21, 1947, Serial No. 769,833

1 Claim. (Cl. 121—41)

This invention relates to control circuits of engine driven portable compressing units and, in particular, concerns means for connecting a speed control valve to the governor or throttle lever of the engine.

A copending application Number 769,832, filed of even date herewith, now Patent No. 2,585,168, granted February 12, 1952, shows a compressor and engine control circuit embodying a speed control valve which is connected to the throttle or governor lever of the engine to vary the speed thereof inversely with the pressure in the storage tank of the compressing unit. The control valve described in said application, like other control valves known to the art, is not intended to overcome any appreciable lever resistance to a change in speed. Consequently, when it is used, for example, in conjunction with the governor of a diesel engine, a booster mechanism is required to move the governor lever so that the engine speed will be accurately controlled. The present invention provides such a booster mechanism.

A control valve of the type described has a lever which is suitably connected to the throttle or governor lever to actuate the same in accordance with the signals of the valve. In the present invention the movements of this lever are used to control a novel booster control valve so that this valve is capable of transmitting the same signals as the speed control valve. The booster valve controls the flow of pressure fluid to a suitable throttle actuating device such as a cylinder and plunger connected directly to the throttle or governor lever. When the valve signals have been followed by the throttle or governor lever, a connection between it and the valve returns the latter to a neutral position.

Other features and objects of the invention will appear in the detailed description of the following drawings in which Figure 1 is a diagram showing where the booster circuit of the present invention is used.

Figure 6 is a view partly in cross section of the booster circuit.

Figure 1:
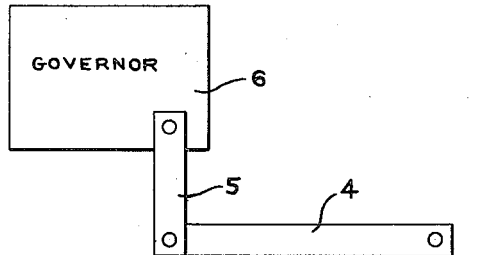
Figure 5:
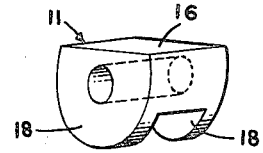
Figure 5 is a detail view of the valve plug.
Figure 2:
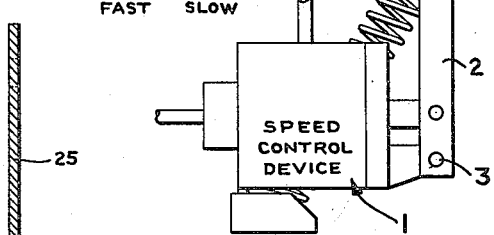
Figure 2 is a longitudinal section of the booster control valve.
Figure 2:
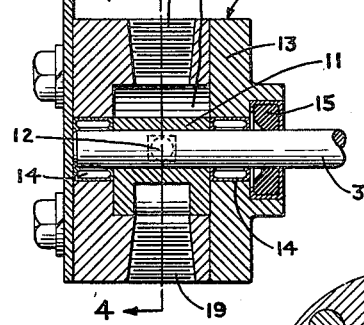
Figure 3:
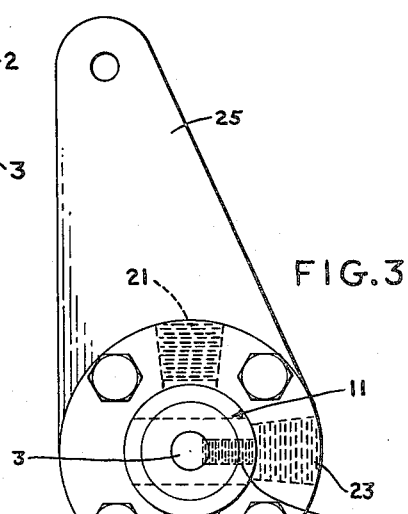
Figure 3 is an end elevation of the booster control valve.

In Figure 1, the speed control valve 1 has a lever 2 which is pivoted at 3. The pivot 3 comprises a pin or shaft 3 which rotates in a suitable bushing in the valve housing. The pivotal movement of the lever 2 and the rotation of the shaft 3 are regulated by the internal mechanism of the valve 1 so that, in the usual case, they bear a desired relationship to the pressure of fluid in the storage tank of the compressing unit. The lever 2 is connected by suitable linkage 4 to the lever 5 of a governor 6 or other suitable engine controlling unit. When the lever 5 is moved to the left the engine speed is increased and when it is moved to the rigid the speed is decreased. In many constructions, movement of the lever 5 requires more force than the valve 1 can supply. In these cases the booster mechanism of the present invention can be used in place of the linkage 4 to provide adequate force and sensitivity to move the lever 5 in accordance with the indications of the valve 1.

The controlling element of the booster circuit is the booster valve 10 shown in detail in Figures 2–5. This valve is connected to the shaft or pin 3 of the valve 1 so that it receives the signals transmitted by the speed control valve. A valve plug 11 is suitably fixed, as by the lock screw 12, to the shaft 3 for rotation therewith. The valve housing 13 is rotatably mounted on the shaft 3 by means of the bearings 14. A lever 25 is fixed to the housing 13 to provide means for rotating it. A suitable seal 15 prevents the escape of fluid from the valve 10 about the shaft 3.

The valve plug 11 has a flat portion 16 which hsa rounded edges adapted to fit inside of the cylindrical valve chamber 17 in the housing 13. The plug 11 may also have end legs 18 which are circular segments of the diameter of the chamber 17. The housing has an inlet 19 for the chamber 17 which is connected to a suitable source of pressure fluid, preferably, the engine oil supply, by a conduit 20. The outlet 21 to the chamber 17 is preferably spaced about one hundred and eighty degrees from the inlet and may be connected to the engine oil pan or other suitable drain by the conduit 22. A port 23 is spaced midway between the inlet 19 and the outlet 21 and is connected to the booster cylinder 30 by means of the conduit 24. When the valve plug 11 is in the position of Figure 4, there can be no flow of fluid through the valve 10. If the plug is rotated by the shaft 3 a slight amount in a counter-clockwise direction (Figure 4a), fluid may flow from the inlet 19 to the port 23. If the plug is rotated slightly in a clockwise direction (Figure 4b), fluid may flow from the port 23 to the outlet 21. Rotation of the housing 13 has the same effect as rotation of the plug 11 in the opposite direction. Thus, flow from the inlet 19 to the port 23 may be obtained in Figure 4a either by rotating the valve plug 11 in a counter-clockwise direction or by rotating the housing 13 in a clockwise direction.

The pressure fluid leaving the valve 10 through the port 23 is led by means of the conduit 24 to the booster cylinder 30 which is connected to the governor lever 5 and converts the pressure of fluid into a force to actuate the lever 5. The booster 30 has a housing 31 with a chamber 32 that is connected to the conduit 24 by means of the port 33. A piston 34 and rod 35 slidably fit in the chamber 32 and a spring 36 is interposed between the bottom of the piston 34 and a cap 37 which closes one end of the housing 31. The piston rod 35 is pivotally connected at 38 to the governor lever 5. The booster cylinder 30 is suitably fixed to the engine (not shown) and is arranged so that the piston rod and lever intersect in an angle of substantially ninety degrees. When pressure is admitted to the chamber 32, the piston 34 and rod 35 are forced to the left to increase the engine speed. When there is no pressure in the chamber 32, the spring 36 forces the piston 34 and rod 35 and the lever 5 to the right to a position of minimum engine speed.

The governor lever 5 is connected to the housing lever 25 so that the response of the lever 5 to the speed signals transmitted to it by the booster 30 rotates the housing 13 on the shaft 3 and the valve plug 11. While a special construction is shown, the connection 40 between the levers 5 and 25 may be a simple rod or link.

Figure 4A:
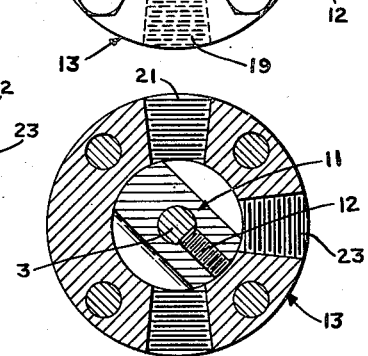
Figure 4a is a cross section similar to Figure 4 showing the valve when pressure fluid is admitted to the booster cylinder.
Figure 4B:
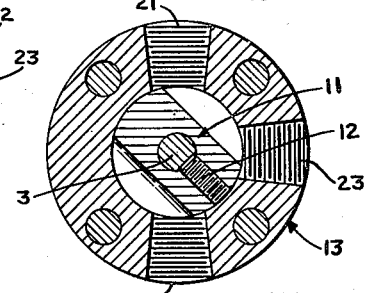
Figure 4b is a cross section similar to Figure 4 and 4a showing the valve when pressure fluid is drained from the booster cylinder.
Figure 4:
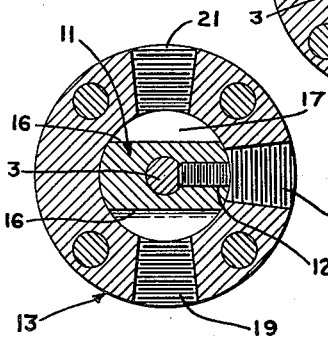
Figure 4 is a cross section of the booster control valve taken on the line 4—4 of Figure 2.

In operation, there is pressure fluid in conduit 20 and the valve plug 11 has a normal rotary position such as that of Figure 4a which corresponds to the maximum speed pivotal position of the speed control lever 2. Pressure fluid flows from the conduit 20 through port 23 and conduit 24 to the booster 30 which therefore forces the lever 5 to the left to a maximum speed position. When the speed control valve 1 calls for a decrease in speed, the shaft 3 and plug 11 are rotated in a clockwise direction to the position of Figure 4b. Pressure fluid is then drained from the booster 30 through the valve outlet 21 and the spring 36 forces the governor lever 5 toward a position of lower speed. As the governor lever 5 moves to the right, the connection 40 between it and the housing lever 25, rotates the housing 13 in a clockwise direction an amount which is directly dependent upon the response of the lever 5 to the valve signals transmitted to it through the booster 30. Clockwise rotation of the housing 13 causes it and the plug 11 to have the relative position of either Figure 4 or Figure 4a blocking the connection between the booster 30 and the drain outlet 21. Thus, further movement of the piston 34 and rod 35 under the influence of the spring 36 is prevented and the engine stops decreasing in speed. If now an increase in engine speed is called for, the accompanying counter-clockwise rotation of the plug 11 (Figure 4a) provides pressure to the booster 30 until the response of lever 5 is complete. At this point the housing 13 has been rotated the same amount in the same direction as the plug 11 so pressure is removed from the booster 30 and there is no further increase in speed.

Certain types of diesel engines use a separate fuel system in starting. When the booster circuit of the present invention is employed with such an engine and uses its oil supply, it is necessary to hold the booster circuit, and thus the governor 6, inactive until the engine has warmed up sufficiently to be put on its normal fuel system. The structure of the connection 40 between the governor lever 5 and the housing lever 25 provides means for preventing the oil pressure in conduit 20 from reaching the booster 30 even though the speed control valve 1 calls for an increase in engine speed. For this purpose the connection 40 is arranged so that its length can be easily shortened prior to starting of the engine. Shortening of the connection 40 rotates the housing 13 in a counter-clockwise direction to the approximate position of Figure 4b so that maximum movement of the valve plug 11 by the lever 2 will move it into the approximate position of Figure 4 but no farther and flow from the conduit 20 to the conduit 24 will be effectively blocked holding the governor lever 5 in the minimum speed position by spring 36 accordingly.

The connection 40 comprises a cylinder 41 which has a rod 42 fixed thereto that is pivotally connected at 43 to the lever 25. A plunger 44 slidably fits in the cylinder 41 and is pivotally connected at 45 to the governor lever 5. A spring 46 in the cylinder 41 bears upon the head of the plunger 44 and the end of the cylinder 41 to yieldably force the connection 40 to its maximum length. An abutment block 47 is fixed to the governor end of the cylinder 41. Within the block 47, a bushing 48 is mounted on the plunger stem 44. The bushing 48 has a transverse stud 49 upon which is mounted a handle 50 and a washer 51 which bears against the abutment block 47. When the handle 50 is properly turned, the bushing 48 is moved a slight amount in a transverse direction relative to the block 47 so as to wedge or lock the plunger 44 against movement relative to the cylinder 41. Thus, in order to shorten the connection 40 and render the booster circuit inoperative, the cylinder 41 is moved to the left against the spring 46 and locked in position by means of the handle 50 and bushing 48. When it is desired to use the booster circuit, the handle 50 is loosened and the spring 46 returns the connection 40 to its operating length.

It will be understood that the specific construction and arrangement of parts of the present invention may be modified within the limits of the appended claim without departing from the spirit of the invention.

What is claimed is:

Means for conveying speed signals from a speed control to a floating control lever on a governor or the like device including, a shaft having a rotary position corresponding to the speed signals to be conveyed, a supply of pressure fluid, a rotatable valve body having a valve chamber mounted on said shaft, said valve body having an inlet for said chamber, an outlet for said chamber, and a port for said chamber, a rotatable valve plug in said chamber for controlling the flow of fluid therethrough, said valve plug being fixed to said shaft for rotation therewith and arranged so that when said speed control calls for an increase in speed said inlet is connected to said port and when said speed control calls for a decrease in speed said port is connected to said outlet, a conduit connecting said inlet to said supply of pressure fluid, said outlet connected to a drain, a first linkage including a casing, a piston slidably mounted in said casing and connected to said governor lever at the floating end thereof, means providing communication between said port and said casing so that pressure fluid admitted from said port to said casing acts on said piston to move it and thus the governor lever towards a position of increased engine speed, spring means abutting said piston for urging it and thus the governor lever to a position of decreased engine speed, a second linkage including, a first rod connected at one end to said rotatable valve body and having an elongated cylinder with a stop therein at the other end thereof, a second rod connected at one end to the medial portion of said lever and provided with a plunger member at the other end thereof slidably mounted in said cylinder of the first rod, spring means in said cylinder for yieldably urging said plunger to the stop means for forcing said rods to their maximum length, and manually adjustable locking means formed on said stop means for fixedly positioning the length to a position in which said valve plug prevents flow of fluid from said inlet to said port to maintain said lever in a decreased speed position.

HOWARD H. PLATTS.

REFERENCES CITED

The following references are of record in the file of this patent:

UNITED STATES PATENTS

| Number | Name | Date |
| --- | --- | --- |
| 1,121,414 | Stafford | Dec. 15, 1914 |
| 1,231,257 | Herr | June 26, 1917 |
| 1,606,361 | Godeau | Nov. 9, 1926 |
| 1,853,613 | Herr | Apr. 12, 1932 |
| 2,020,847 | Mitereff | Nov. 12, 1935 |
| 2,294,410 | Lamberton | Sept. 1, 1942 |
| 2,332,925 | Martin | Oct. 26, 1943 |
| 2,369,324 | Thompson | Feb. 13, 1945 |